United States Patent [19]

Stahl et al.

[11] Patent Number: 4,565,357
[45] Date of Patent: Jan. 21, 1986

[54] QUICK-ACTING CLAMPING DEVICES

[75] Inventors: Bernhard Stahl, Neunkirchen-Salchendorf; Horst Böhm, Siegen, both of Fed. Rep. of Germany

[73] Assignee: Optima Spanntechnik GmbH, Siegen, Fed. Rep. of Germany

[21] Appl. No.: 530,206

[22] Filed: Sep. 8, 1983

[30] Foreign Application Priority Data

Sep. 13, 1982 [DE] Fed. Rep. of Germany ....... 3233940

[51] Int. Cl.$^4$ ............................................. B23Q 3/08
[52] U.S. Cl. .................................... 269/32; 74/110
[58] Field of Search ............. 269/27, 32, 33; 74/110, 74/520

[56] References Cited

U.S. PATENT DOCUMENTS 3,940,122 2/1976 Janzen .................................. 269/32
4,418,899 12/1983 Zimmermann et al. ............. 269/32

Primary Examiner—James G. Smith
Assistant Examiner—Judy J. Hartman
Attorney, Agent, or Firm—Toren, McGeady, Stanger, Goldberg & Kiel

[57] ABSTRACT

A quick-acting clamping device for clamping tools or workpieces in machine tools comprises a piston which is slidable transversely to the clamping direction and which acts on a toggle mechanism which in turn moves a clamping piece. A pressure plate upon which the toggle mechanism acts is displaceable in the clamping direction in a housing which contains the transverse piston. The fluid under pressure which acts on the transverse piston to activate the toggle mechanism also acts directly on the pressure plate to assist in clamping. Because of the assisting force produced by the pressure plate it is possible for the transverse piston to move the members of the toggle mechanism from starting positions in which they lie at large angles to the clamping direction, that is with a big angular displacement from their dead-center position, in which they initially exert only a small force on the clamping piece. Because of this large angular displacement of the members of the toggle mechanism, the toggle mechanism by itself can produce a large linear movement of the clamping piece.

10 Claims, 3 Drawing Figures

QUICK-ACTING CLAMPING DEVICES

BACKGROUND OF THE INVENTION

This invention relates to quick-acting clamping devices for use, for example, for the firm clamping of tools, workpieces or other members in machine tools.

The invention is particularly concerned with such a clamping device which comprises a transverse piston which is slidably mounted in a housing for movement in a direction transverse to a clamping direction, means including a pressure chamber for applying fluid pressure to the transverse piston, at least one pressure lever bearing at one end against the transverse piston and at the other end against a pressure plate, which is displaceable in the clamping direction relative to the housing, and a clamping piece is acted upon by the pressure plate and projects from the housing, the pressure lever being pivotal between the piston and the pressure plate between an inclined position and an extended position with respect to the clamping direction.

Preferably there are two pressure levers which together form a toggle mechanism and which bear one against each of two opposite sides of a pressure piece, which forms part of the transverse piston and is displaceably seated in the piston for movement in the clamping direction.

The invention also relates to a method of operating such a clamping device.

A quick-acting clamping device constructed in this manner is disclosed in German Offenlegungsschrift (Published Application) No. 23 19 686. With this known quick-acting clamping device, only relatively small distances in the clamping direction can be moved by the clamping piece, since the large inclined positions of the pressure lever or levers which otherwise would be required relative to the extended position would necessitate extra-ordinarily high pressure forces on the piston which pivots the pressure lever or levers from the inclined position to the extended position. The diameter of the piston would also have to be large. With such a quick-acting clamping device, the requirement for high clamping forces on the one hand and the largest possible clamping clearance of the clamping piece on the other hand are therefore mutually contradictory, so that to produce adequately high clamping forces, for example in the clamping of tools or workpieces and other devices in machine tools, hitherto an axial movement of the clamping piece of only 0.3 mm has been achieved.

From German Offenlegungsschrift (Published Application) No. 21 45 643, it is furthermore known, in a quick-acting clamping device of the initially described type, to move the pressure levers beyond the extended position, which is a dead-centre position of the toggle, into a second but only slightly inclined position, in order thereby to achieve locking in the clamped position, without fluid pressure corresponding to the clamping force having to act continually on the piston which pivots the pressure levers. This quick-acting clamping device likewise suffers from the above-mentioned disadvantages.

In both these known quick-acting clamping devices, limit switches are provided for functional control of the device, but monitoring of the clamping force required in the clamped state is not possible by these switches.

It is the main object of the present invention to provide a quick-acting clamping device which ensures both high clamping forces and also a large axial movement of the clamping piece. It is a further object to provide a method of operating such a quick-acting clamping device, by which the control of a predetermined clamping force is possible in a simple manner.

SUMMARY OF THE INVENTION

According to this invention, a clamping device as initially described is characterised in that the pressure plate is in fluid communication at its face which is nearer to the piston with the pressure chamber and is fluid-sealed with respect to the housing so that, in use, the fluid under pressure which acts on the piston to actuate the pressure lever also acts on the pressure plate to assist in producing the clamping force.

In this manner a functional division between an initial idle part of the stroke of the clamping piece and a subsequent controlled clamping and locking of the clamping piece is achieved. The pressure plate can without difficulty be made very large on its boundary face nearer the piston, which is acted upon by the fluid pressure, since a line normal to its surface is oriented in the clamping direction, whereas the transverse piston in which the pressure piece is seated is disposed transversely to the clamping direction and thus transversely to the axis of the housing which is usually cylindrical, so that the maximum realisable piston area is inevitably smaller than the area of the pressure plate acted upon by the fluid pressure. The force exerted by the fluid pressure upon the pressure plate is therefore larger than the force acting upon the transverse piston. The pressure piece and the pressure levers are therefore moved during the initial idle part of the stroke of the clamping piece with only a small force but completely free of play, since the transverse piston follows the movement of the pressure plate without delay. Even with fairly large initial inclinations of the pressure levers, no especially large pressures therefore need to be applied to the transverse piston when overcoming this initial inclination, so that all relatively movable components can be constructed in a very simple and inexpensive manner.

After the clamping piece, following the initial idle part of its stroke, has come to bear against the object to be clamped, the clamping operation has the pressure levers now in only slightly inclined positions that is to say with the toggle mechanism approaching the dead-centre position which favours the application of a large force. Thus the levers act on the pressure plate, and make possible very high clamping forces. Thus in spite of an improved, that is lengthened, idle stroke of the clamping piece, a sufficient travel for high clamping forces still remains available and it is indeed even possible, without substantial loss of clamping force, to bring the pressure levers beyond the extended position, that is past dead-centre, into a new slightly inclined position, in which the transverse piston bears at its second pressure surface against the housing. As a consequence, the locking position disclosed in German Offenlegungsschrift No. 21 45 643 is still achieved, so that during clamping the fluid pressure can fall without the clamping force being thereby reduced.

A further advantage of the invention lies in the improved lubrication of the moving components, because due to the sealing of the pressure plate with respect to the housing and its loading with pressure fluid, at least the pressure lever which acts upon the plate and the components adjoining it are continually simultaneously lubricated by the pressure fluid, which is generally oil.

This lubrication can also be provided for the other pressure lever, which bears against the housing, by the provision of a suitable fluid communication with this region. The releasing operation of the clamping piece is facilitated by a pressure plate constructed as a piston capable of being loaded on both sides and a communication of the further pressure chamber thus created with the pressure chamber of the piston which causes releasing.

Advantageously, the pressure levers are very simply constructed, preferably from flat strip material.

By means of a measuring piston which is displaced in parallel by the transverse piston, it is possible to monitor the position of the transverse piston not only in the limiting inclined and locking positions but also in any intermediate position, especially the extended position. This is particularly advantageous in conjunction with a pressure transmitter in the pressure chamber of the transverse piston, since by this means the fluid pressure can be monitored as a function of the magnitude of the inclination of the pressure lever or levers.

A rotary mechanism connected with the housing for rotating the clamping piece about an axis extending in the clamping direction permits the clamping piece firstly to be automatically rotated into a locking position and then to be firmly clamped. Likewise, a displacement mechanism connected with the housing for displacing the clamping piece in the clamping direction enables very large idling strokes to be executed independently of the movement involved in the clamping operation, so that the quick-acting clamping device can also clamp objects of widely varying thickness or retract the clamping piece completely into surrounding parts of the clamping device.

The clamping piece is preferably rotated by at least one fluid pressure-driven rod which is displaceable transversly to the clamping direction. Likewise, a fluid pressure-driven displacement piston, connected in a tension-transmitting and pressure-transmitting manner with the housing, is preferably provided for the displacement mechanism.

In order to ensure that functions of the quick-acting clamping device take place in succession; that is to say that displacing, rotating and clamping of the clamping piece are not initiated until the preceding movement has been completed, an edge control of the pressure fluid at the relevant piston edges is preferably provided. This is done by providing passages through cylinder walls in positions such that they are opened by the fluid pressure-driven pistons in at least one of the limiting positions of the piston, and are connected in fluid communication with the pressure chamber of a piston next to be actuated.

According to the method aspect of this invention, with a quick-acting clamping device in accordance with the invention described above, during clamping, the fluid pressure on the pressure side of the transverse piston is measured as a function of the distance travelled by the transverse piston and, when deviations occur from predetermined values with which the measured value is compared a signal is triggered. In this way, in spite of the complete automation of the clamping operation, any functional error that may occur can be easily detected and in particular assurance can be provided that the quick-acting clamping device actually produces the desired clamping force.

An example of a clamping device in accordance with the invention will now be described with reference to the accompanying drawings in which.

DESCRIPTION OF THE PREFERRED EMBODIMENT

Figure 1:
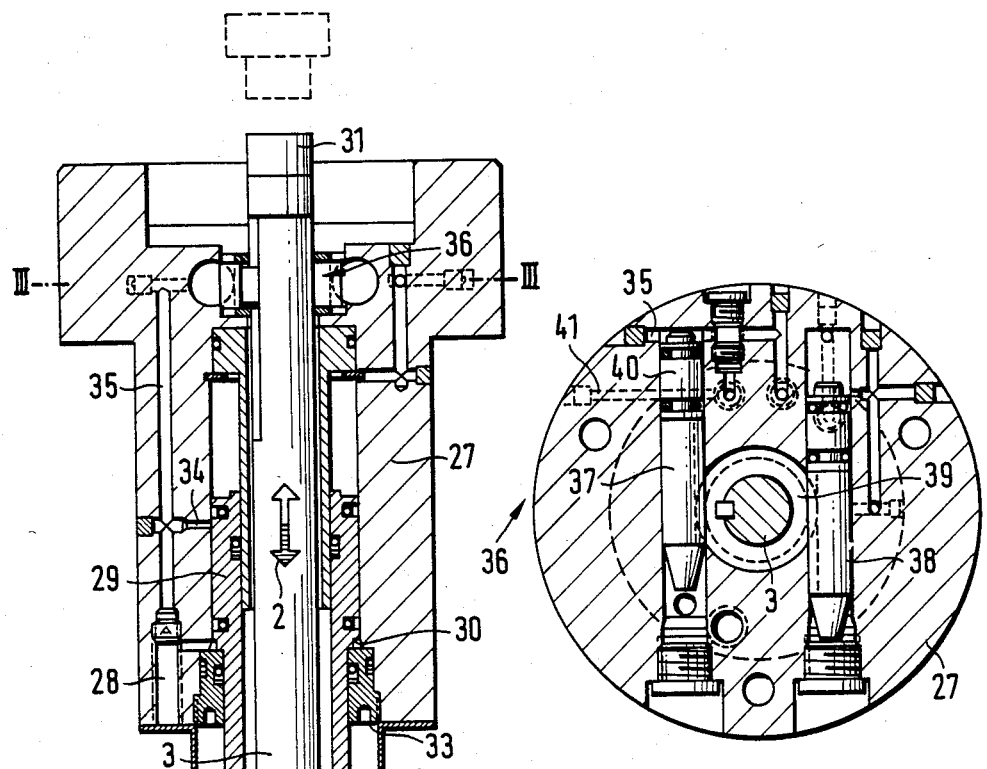
FIG. 1 is a somewhat schematic axial section through the device.

The device comprises a cylindrical housing 1 containing a transverse piston 5, which can be subjected to fluid pressure selectively on both sides, and seats a pressure piece 4, which is displaceable in the clamping direction, that is upwardly as seen in FIG. 1. The piston 5 is movable by the fluid pressure transversely to the clamping direction 2 of a clamping piece 3. Two pressure levers or toggle levers 6 and 7 bear against the two sides of the pressure piece 4 and the pressure lever 7 is supported from the housing 1 by a fluid-sealed adjustment stop 8. The pressure lever 6, on the other hand, bears against a pressure plate 9, which is displaceable in the clamping direction and is fixed to the clamping piece 3 which projects out of the housing 1, and is fluid-sealed relative to the housing 1. At the ends of the pressure levers 6 and 7 adjacent the pressure piece 4, the levers can be pivoted by movement of the transverse piston 5 from an extreme inclined position illustrated in FIG. 1 and making an angle 10 with an upright extended position, into an extended or dead-centre position and beyond this position into a second oppositely inclined position shown in broken lines. This position is a locking or clamping position. The levers 6, 7 and the piece 4 thus together form a toggle mechanism.

The pressure plate 9 is in fluid communication at its under face 11 which faces towards the piston 5 with a pressure chamber 13 of the transverse piston 5. The pressure plate 9 is fluid-sealed with respect to the housing 1.

A face 14 of the piston 5 associated with the pressure chamber 13 bears, in the position shown in FIG. 1, against the housing 1, whereas in the locking position illustrated in broken lines, an opposite face 15 of the piston 5 bears against the housing 1. A pressure chamber 16 associated with the piston surface 15 is in fluid communication, via a line 18, with an upper face 17 of the pressure plate 9 opposite to the under face 11.

The space surrounding the pressure lever 7 which bears against the housing 1, is in fluid communication via an annular groove 19 and passages 20 and 21 through the piston face 14, with the pressure chamber 13. It is also in communication via a cavity 22 surrounding the pressure lever 6, with the under face 11 of the pressure plate 9. The pressure levers 6, 7 are of flat steel strip with semi-cylindrical stages.

Figure 2:
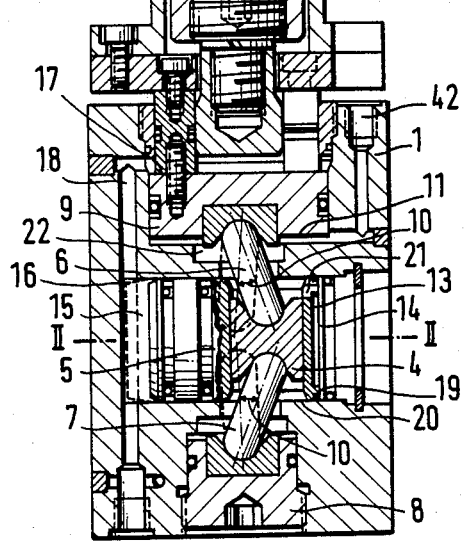
FIG. 2 is a cross-section through the device on the line II—II of FIG. 1.

From FIG. 2 it can be seen that the pressure piece 4 is mounted so that it can slide to and fro in the clamping direction inside the transverse piston 5. A pin 23, which is inserted in the transverse piston 5 transversely to its direction of movement causes a measuring piston 24 to partake of the movement of the piston 5 and in this way, the position of the transverse piston 5 can be established in a simple manner by means of limit switches or differential travel switches, not illustrated in the drawing, of known type. A pressure transmitter 25 indicates the fluid pressure in the pressure chamber 13.

The housing 1 is connected, in a compression-transmitting and tension-transmitting manner, to a displacement piston 26 (FIG. 1), which surrounds part of the clamping piece 3. The displacement piston 26 is slidably mounted and sealed in a further housing 27. A connecting bore 28 in the housing 27 supplies pressurised fluid to a pressure head 29 of the displacement piston 26. The pressurised fluid acts on a piston surface 30 and as a result the clamping piece 3 and a T-groove block 31, which is for example of rhombus shape and is mounted at the free end of the clamping piece 3, is raised, together with the housing 1, until an abutment shoulder 32 of the housing 1 bears against an end face 33 of the housing 27. When the displacement piston 26 is in this position, the pressure head 29 no longer covers a cylinder wall passage 34, so that the pressure fluid passes via a duct 35 to a rotary mechanism 36 of the clamping piece 3.

Figure 3:
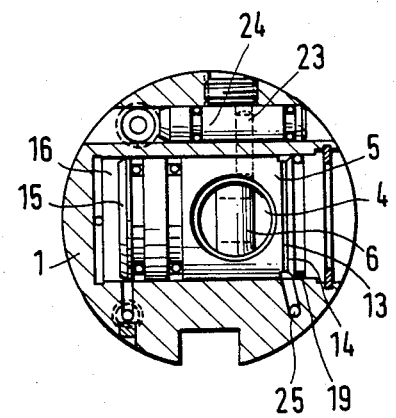
FIG. 3 is a cross-section through the device on the line III—III of FIG. 1.

The rotary mechanism 36 comprises, as shown in FIG. 3, two oppositely acting, piston-driven toothed racks 37 and 38, which act rotationally upon a ring gear wheel 39 which is mounted so that it is displaceable axially along, but is not rotatable relative to, the clamping piece 3.

Only when a pressure piston 40, which acts upon the toothed rack 37, reaches its limiting position upon completion of the rotary movement, is a cylinder wall passage 41 exposed so that the pressure fluid can pass via a tube not shown in the drawing, to a connecting bore 42 in the housing 1 (FIG. 1) and can thus act upon the pressure plate 9 and the transverse piston 5 so that the clamping operation is initiated and carried out.

The unclamping or releasing operation takes place in the reverse sequence by introducing pressure fluid into the pressure chamber 16 associated with the piston surface 15 for initially displacing the transverse piston into the released position, and then flowing the pressure fluid to the rotary mechanism where the toothed rack 38 of the rotary mechanism 36 is actuated in place of the rack 37.

When the clamping piece 3 has been fully retracted, it triggers a further contact by means of a switching strip, not illustrated in the drawing, and this further contact indicates that the limiting position of the clamping piece has been reached.

The set-point comparison device for setting the position and fluid pressure at the transverse piston 5 is not itself shown in the drawing, since these are conventionally known devices.

Hydraulic fluid supplied under pressure by a hydraulic unit, not illustrated in the drawing, is generally used as the pressure fluid.

The clamping piece 3 can be engaged by the combination of linear and rotary movement with its rhombus-shaped T-groove block, both into T-section grooves and also into known aprons of an object to be clamped. The idle part of the stroke of the clamping piece 3 which is produced by co-operation between the pressure plate 9 and the transverse piston 5 before final fixed clamping commences, can easily amount to several millimeters, so that engagement into radial serrations, for example in turret lathes, can be achieved in a single operation comprising clamping and locking, neither a displacement mechanism or a rotary mechanism then being necessary.

All the participating component assemblies of the device undergo a change in length during the clamping stroke. The change in length produces stress in the material of the quick clamping device and this can be converted, according to the characteristic stress/strain curve of the material used, into a clamping force in the clamping piece. Check measurement of the clamping force is carried out by simultaneous measurement of the travel and pressure at the transverse piston 5 in the extended position of the pressure levers 6 and 7.

We claim:

1. In a quick-acting clamping device using a pressure fluid for moving the clamping device between released and locked positions thereof, comprising a first axially extending housing (1), a first piston (5) slidably mounted in said first housing for displacement therein transversely of the axial direction of said first housing, a pressure plate (9) located within said first housing in spaced relation from said first piston in the axial direction of said first housing and being displaceable in said first housing in the axial direction thereof, at least one pressure lever (6, 7) located within said first housing supported at one end thereof against said first piston and at the other end thereof against said pressure plate and said pressure lever being displaceable upon the displacement of said first piston between a first position where the clamping device is released and a second position where the clamping device is locked, a first pressure chamber within said first housing with said pressure lever located within said first pressure chamber, an axially elongated clamping piece (3) having a first end and a second end with the first end located within said first housing and said clamping piece extending axially out of said first housing with the axes of said clamping piece and said first housing in parallel relation and with the second end of said clamping piece being spaced outwardly from said first housing, said clamping piece being axially displaceable between a released position and a locked position, a second piston (26) secured to said first housing and laterally enclosing at least an axially extending portion of said clamping piece between the first and second ends thereof, a second housing (27) laterally enclosing at least an axially extending part of said second piston and spaced in the axial direction of said second piston from said first housing, said second piston being axially displaceable relative to said second housing for axially displacing said clamping piece and said first housing, wherein the improvement comprises that said pressure plate (9) has a first surface facing toward said first piston and an oppositely directed second surface facing toward said second housing, said first piston having a first end surface and a second end surface extending transversely of the direction of displacement of said first piston, a second pressure chamber within said first housing with said first end surface of said first piston located within said second pressure chamber, a third pressure chamber within said first housing with said second end surface of said first piston located within said third pressure chamber, said pressure plate being in fluid sealed contact with said first housing, said first surface of said pressure plate said pressure chamber and said first end of said first piston being in fluid communication, said second housing having a wall passage (34) therethrough, said second piston being displaceable between a first position when the clamping device is released and a second position where the clamping device is being locked and in its first position said second piston closes said wall passage and in the second position it is displaced out of the path of said wall passage, a rotary mechanism (36) located within said second housing and extending around said clamping piece, a first duct (35) connecting said wall passage to said rotary mechanism and affording flow of the pressure fluid to said rotary mechanism when said second piston is in the second position for rotatably displacing said clamping piece toward the locked position, a second duct in said second housing and in flow communication with said rotary mechanism and extending to said first housing where it is in fluid communication with said first surface of said pressure plate said first pressure chamber and said first end surface of said first piston within said second pressure chamber for directing the pressure fluid from said rotary mechanism to said pressure plate and said first piston after said clamping device has been displaced by said rotary mechanism, a third duct within said first housing providing fluid communication between said second surface of said pressure plate and said second end surface of said first piston located within said third pressure chamber so that in effecting the release of said clamping device initially said first piston is displaced into the first position, and duct means connecting said first housing with said rotary mechanism for flowing the pressure fluid to said rotary mechanism only after said first piston is displaced into the released first position.

2. A clamping device as claimed in claim 1 wherein said first piston includes a pressure piece which is mounted in said first piston for movement in the axial direction of said first housing, said at least one pressure lever bearing at said one end thereof against said pressure piece, and further comprising a second pressure lever bearing at one end thereof against said pressure piece on the side thereof remote from said at least one pressure lever and at the other end thereof against said first housing, said pressure levers together forming a toggle mechanism, and a fourth pressure chamber within said first housing surrounding said second pressure lever being in fluid communication with said first pressure chamber.

3. A clamping device as claimed in claim 2, in which said pressure levers are formed of flat strip material.

4. A clamping device according to claim 1, further comprising a measuring piston displaceably mounted within said first housing for movement parallel to said first piston, and means for interconnecting said measuring piston and said first piston so that said measuring piston follows the movement of said first piston.

5. A clamping device as claimed in claim 4, further comprising a pressure transmitter and means communicating said pressure transmitter with said second pressure chamber.

6. A clamping device as claimed in claim 1, wherein said rotary mechanism includes at least one fluid pressure-operated toothed rack, means mounting said rack for movement transverse to the axial direction of said clamping piece, and annular toothed means operatively fixed to said clamping piece, said toothed rack meshing with said annular toothed means.

7. A clamping device as claimed in claim 1, further comprising a displacement mechanism connected to said first housing, and means connecting said displacement mechanism to said clamping piece whereby said displacement mechanism displaces said clamping piece in an idle movement in said clamping direction to, in operation, withdraw said clamping piece from a member being clamped by said device.

8. A clamping device as claimed in claim 7, in which said displacement mechanism includes a fluid pressure-operated second piston and means operatively connecting said second piston to said first housing for the transmission of compression and tension forces and corresponding movement between said piston and said first housing in said clamping direction.

9. A clamping device as claimed in claim 6, wherein said rotary mechanism further comprises a rack cylinder and a rack piston in said cylinder for moving said toothed rack and further comprising a displacement cylinder wall surrounding said second piston, means defining a passage having a port in said cylinder wall and means defining a further passage having a further port in the wall of said cylinder of said rack piston, said ports being locked in positions in which they are uncovered by said rack piston when said rack piston has moved into limiting positions, means for supplying fluid under pressure to said displacement piston and means communicating said passage in said cylinder wall with said passage in the wall of said cylinder of said toothed rack piston whereby, after said fluid displacement piston has moved, fluid under pressure supplied to said fluid displacement piston flows through said passages and through said communicating means to operate said toothed rack piston.

10. A method of operating a clamping device comprising an axially extending housing, a piston slidably mounted in the housing for displacement therein transversely of the axial direction of the housing, a pressure plate located within the housing in spaced relation from the piston, at least one pressure lever located within the housing and extending between the piston and the pressure plate and being movable by the piston from a position inclined relative to the axis of the housing and a position extending general parallel to the axis of the housing, a pressure chamber within the housing with one end of the piston located within the pressure chamber, the method comprising the steps of supplying pressure fluid into the pressure chamber for displacing the piston and moving the pressure lever from the inclined position into the position parallel with the axis of the housing, measuring the pressure of the pressure fluid in the pressure chamber, measuring the distance travelled by the piston as a result of the pressure fluid acting in the pressure chamber, comparing the relationship between the measured pressure of the pressure fluid and the distance travelled by the piston with a predetermined relationship between the pressure and the distance; and producing a signal when the relationship between the measured pressure and the measured distance travelled deviates from the predetermined relationship.

* * * * *